No. 870,959. PATENTED NOV. 12, 1907.
A. S. H. HITCHINGS.
INSTRUMENT FOR USE IN DETERMINING THE FUNCTIONS OF CIRCLES.
APPLICATION FILED DEC. 21, 1905. RENEWED JUNE 19, 1907.

WITNESSES:

INVENTOR
Arthur S. H. Hitchings
BY
ATTORNEYS

UNITED STATES PATENT OFFICE.

ARTHUR SEBASTIAN HAYDEN HITCHINGS, OF RIO DE JANEIRO, BRAZIL.

INSTRUMENT FOR USE IN DETERMINING THE FUNCTIONS OF CIRCLES.

No. 870,959.      Specification of Letters Patent.      Patented Nov. 12, 1907.

Application filed December 21, 1905. Serial No. 292,746. Renewed June 19, 1907. Serial No. 379,798.

*To all whom it may concern:*

Be it known that I, ARTHUR SEBASTIAN HAYDEN HITCHINGS, a citizen of the United States of Brazil, and a resident of Rio de Janeiro, Brazil, South America, have invented a new and Improved Instrument for Use in Determining the Functions of Circles, of which the following is a full, clear, and exact description.

Many attempts have been made to "square the circle", but while they have usually been of a very ingenious nature, they have not solved the problem except by methods of approximation. They have not been strictly accurate mathematically. While I do not claim to have supplied this deficiency in these calculations that have been made, yet I have succeeded in producing certain geometrical constructions which have provided me with means for forming an instrument for use in determining the area and circumference of a circle from a known diameter.

Figure 1:
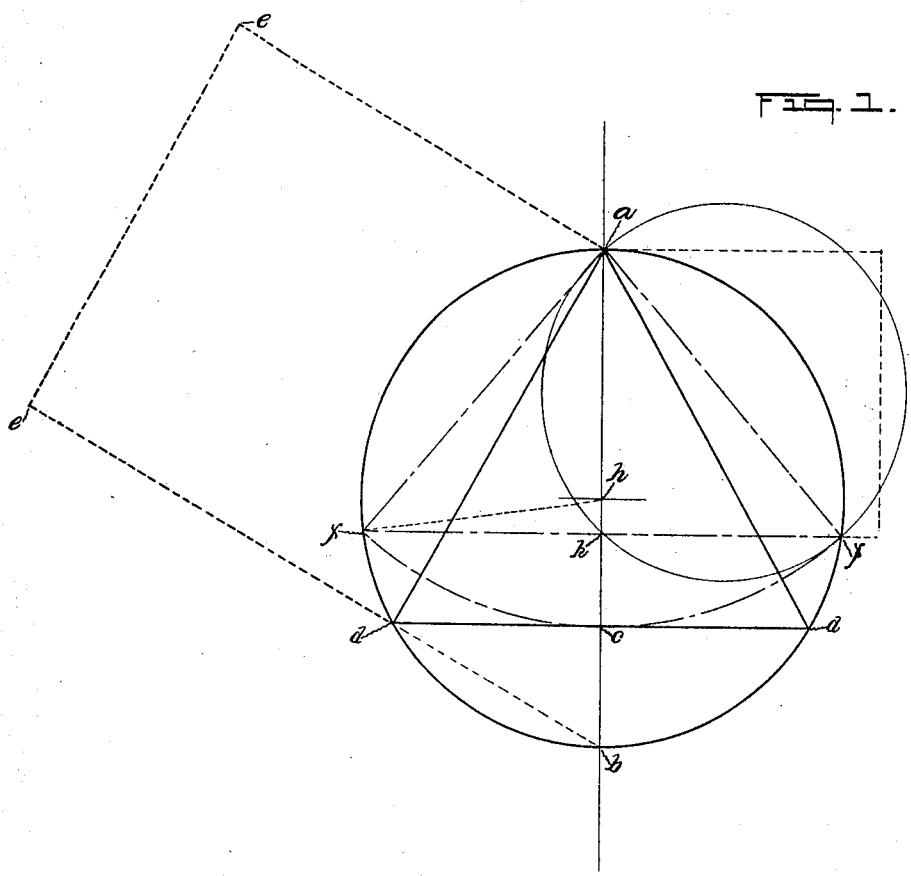
Figure 2:
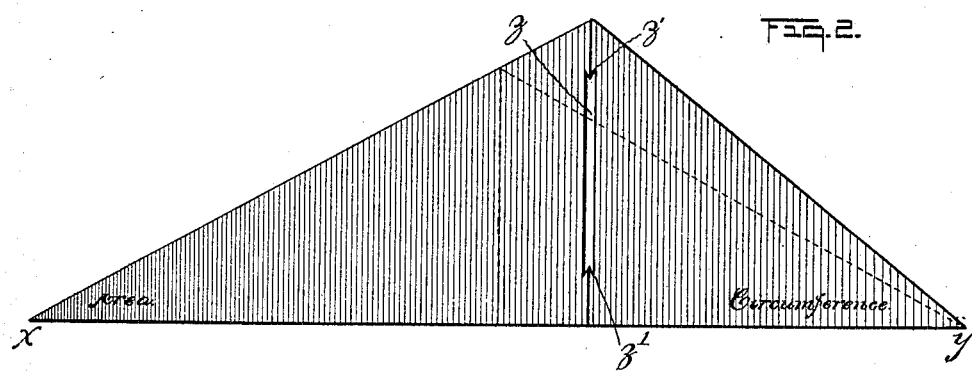

Reference is to be had to the accompanying drawings forming a part of this specification, in which Figure 1 is a geometrical diagram showing the way in which I have arrived at my conclusions; and Fig. 2 is a plan of the instrument forming the subject of my invention.

Referring first to Fig. 1, it will be noticed that the main part of the figure is a circle with a radius $R$; then by the ordinary principles of geometry, the diameter is equal to $2R$, the circumference to $2\pi R$, and the area to $\pi R^2$. On the figure I have drawn a diameter $ab$. On this diameter from the point $a$ I have measured a distance equal to $\frac{1}{4}$ of the circumference, or $1/2\pi R$. At the point $c$ where the end of this line falls on the diameter, I have drawn a perpendicular line $dd$. The points $d$ and $d$ at which this diameter intersects the circumference of the circle I have connected with the point $a$ so as to form an isosceles triangle inscribed within the circle. Now, by a known theorem of geometry (*Euclid Appendix* 1, 39), "The area of a circle is equal to the rectangle having as its sides the radius of the circle and a straight line equal to one-half of its circumference." Therefore it is obvious that the area of the circle is also equal to a rectangle formed with one side equal to the diameter of the circle, and the other side equal to one-quarter of its circumference. In other words, the area of the circle represented in Fig. 1, is equal to the product of the lines $ac$ and $ab$. This proposition of course depends upon the knowledge of the circumference, and it will be observed that I am proceeding to obtain the desired results by working backwardly from the circumference itself. By another known theorem of geometry, the sides of an inscribed triangle multiplied together produce a quantity equal to that obtained by multiplying the altitude of the triangle by the diameter of the circumscribed circle. In the present case the altitude of the triangle is $ac$, and the diameter of the circle $ab$, while the two sides of the triangle are $ad$ and $ad$. This theorem therefore is reducible to the following: The product of $ad$ and $ad$ is equal to the product of $ac$ and $ab$, which is equal to the area of the circle, but as $ad$ and $ad$ are equal, it is obvious that the square of either is equal to the area of the circle, and therefore the line $ad$, for example, is equal to one side of a square the area of which is equivalent to that of the circle. This square is represented on the figure by the figure $a\,d\,e\,e$.

I will now show the lengths of the various lines and the size of the angle between the diameter and the line $ad$. By construction the line $ac$ is $1/2\pi R$. We have just discovered that the line $ad$ is equal to the square root of the area of a circle, which is $R\sqrt{\pi}$. Therefore the angle $cad$ is the angle whose cosine is equal to $1/2\pi R$ divided by $R\sqrt{\pi}$. This expression is by cancellation equal to $1/2\sqrt{\pi}$, which is equal approximately to .8862. The angle whose cosine is equal to this number is 27° 35′ 45.6. Therefore, if a right-angled triangle is constructed having the angle between its base and hypotenuse equal to the angle which has just been described, it will be similar to the triangle $adb$, and the ratio between the hypotenuse and the base will be equal to that between the diameter of the circle and the square root of its area; or, more generally stated, any line cutting the angle mentioned above, on a line perpendicular to the base, or parallel with the third side $db$ of the original triangle, will intersect the base and hypotenuse at distances from the meeting point of the base and hypotenuse which bear a ratio to each other equal to the ratio between the diameter and a quantity having a certain definite relation, in this case the square root, with respect to the function of the circle to be determined, which here is the area.

Referring again to Fig. 1, it will be observed that I have taken the distance $ac$ and struck an arc from $a$ as a center. Where this arc intersects the circumference of the circle at the points $f$ and $f$ I have drawn a line, which obviously is perpendicular to the diameter $ab$, and I have also connected the points $f$ and $f$ with the point $a$, thus inscribing a second isosceles triangle in the circle. The lengths of the lines $af$ and $af$ which are obviously equal will now be determined. In order to do this, the center $h$ of the circle is connected with the point $f$ by a line $hf$. The triangle $afh$ is thus produced. The distance $ah$ is the radius of the circle, which is $R$. The distance $fh$ is the same. The line $af$ being equal to the line $ac$, is $1/2\pi R$, therefore by a well-known theorem of trigonometry the cosine of the angle $caf$ is equal to $$\frac{R^2 + \tfrac{1}{4}\pi^2 R^2 - R^2}{2 \times \tfrac{1}{2}\pi R^2}.$$

This expression by cancellation becomes $1/4\pi$, which is equal to approximately .785398. The angle whose cosine is equal to this decimal is 38° 14 32.9. Now if a circle be circumscribed about the line $af$ as a diameter, its circumference will be equal to $1/2\pi^2 R$. If the point in which the line $ff$ intersects the line $ab$ is designated as $k$, the length of the line $ak$ is obviously equal to the cosine of the angle $fak$, times the expression $1/2\pi R$. As has been stated, the cosine of this angle is $1/4\pi$, consequently the length of the line $ak$ is $1/8\pi^2 R$, which is $\frac{1}{4}$ of the circumference of the circle formed on the line $af$ as a diameter. Therefore this line $ak$ represents a quarter of this circumference, and can be used for the purpose of forming an instrument to determine circumferences. With these facts in mind, I have constructed an instrument which is shown in Fig. 2. This instrument consists of a pair of right-angled triangles the vertical sides of which are coincident with each other and their bases on the straight line. This instrument is provided with two angles $x$ and $y$, the angle $x$ corresponding to the angle $dab$, and the angle $y$ to the angle $fab$.

From the principles which have been deduced above, it will be obvious that the hypotenuse of the triangle having the angle $x$ represents the diameter of a circle, and the base represents the square root of the area of the same circle. Also with reference to the other triangle, the hypotenuse represents the diameter, and the base $\frac{1}{4}$ of the circumference. Therefore, if it is desired to find the area or circumference of a circle of which the diameter is known, all that it is necessary to do is to lay off this diameter on the hypotenuse from the point at which the hypotenuse intersects the base, then draw a line from the end of this line parallel to the line between the two triangles or the third side of the triangle intersecting the base. The distance between this point of intersection and the point at which the base and hypotenuse meet will be equivalent to the square root of the area, or $\frac{1}{4}$ of the circumference, according to which triangle is used.

I have shown the instrument as being provided with a perforation $z$, by means of which it can be placed upon a straight line on a paper, the perforation being provided with projections $z'$ coincident with the boundary line of the two triangles.

Having thus described my invention, I claim as new and desire to secure by Letters Patent:

1. A plotting instrument comprising a triangular plate composed of two right angle triangles having coinciding vertical sides and having their bases in the same straight line, the acute angle adjacent to the base of the one triangle being that angle contained between the diameter of a given circle, and a line equal to one fourth the circumference of said circle and drawn from one end of said diameter to intersect the circumference of the circle, the acute angle adjacent to the base of the other triangle being that angle contained between the diameter of the said circle and a line equal to the square root of the area of the circle drawn from one end of said diameter and intersecting the circumference of the circle, said triangular plate having a slot along the line representing the coinciding vertical sides of the triangles, the ends of the slot being provided with projections coincident with said line.

2. A plotting instrument comprising a triangular plate composed of two right angle triangles having coinciding vertical sides and having their bases in the same straight line, the bases and the hypotenuses of the triangles representing functions of a given circle, and the plate being provided with a slot along the line representing the coinciding vertical sides of the triangles, the ends of the slot being provided with projections coincident with said line.

In testimony whereof I have signed my name to this specification in the presence of two subscribing witnesses.

ARTHUR SEBASTIAN HAYDEN HITCHINGS.

Witnesses:
   JOHN LIDGERWOOD,
   EDUARDO TUXLORA.